UNITED STATES PATENT OFFICE.

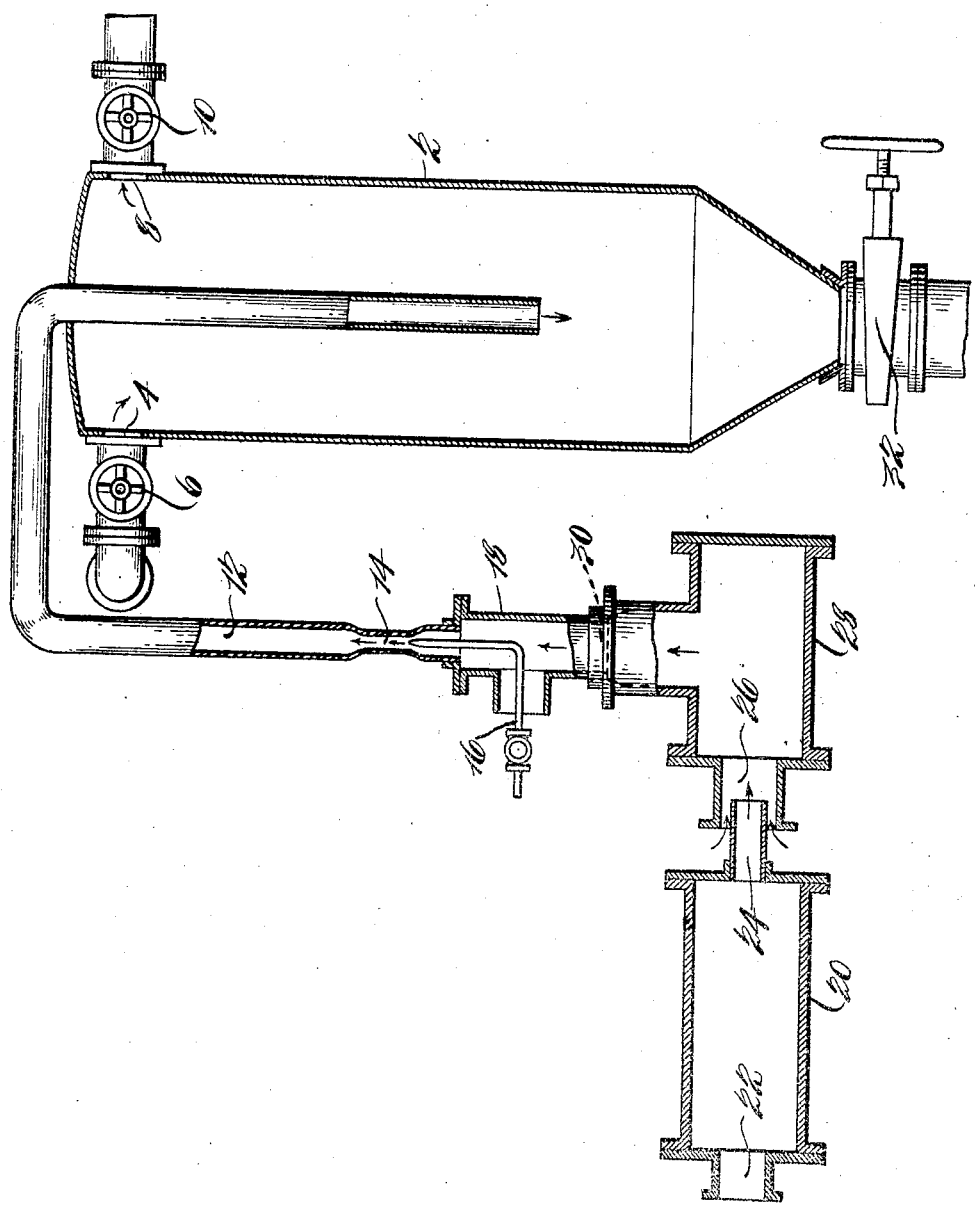

ANGUS MACLACHLAN, OF PERTH AMBOY, NEW JERSEY.

APPARATUS FOR TREATING WASTE ORGANIC SUBSTANCES.

1,359,085.     Specification of Letters Patent.     Patented Nov. 16, 1920.

Application filed November 23, 1918. Serial No. 263,814.

*To all whom it may concern:*

Be it known that I, ANGUS MACLACHLAN, a citizen of the United States, residing at Perth Amboy, New Jersey, have invented certain new and useful Improvements in the Apparatus for Treating Waste Organic Substances, of which the following is a clear, full, and exact description.

My invention relates to a process of and apparatus for the treatment of waste organic matter such as sewage, garbage and the like, and among the objects of the invention are the more effectual separation of the grease from the solid constituents of such waste organic matter; the consequent recovery of a much larger proportion of the grease than has been heretofore possible, and the production of a grease in which fatty acids are set.

Although the claims of the present application relate to my improved apparatus, claims to the process being included in my application Ser. No. 302,243, nevertheless, in order that a full disclosure may be made in the present application, the process, as well as the apparatus for carrying out the process, is described.

By my improved process of treatment of waste organic matter, the solid residue, after being pressed to eliminate the water, drys out and forms a fluffy mass practically free from grease. In the processes heretofore used, the solid residue, after pressing, forms into cakes, owing to the large amount of grease still contained therein. These cakes are very difficult and expensive to dry.

An important feature of my invention is the treatment of waste organic matter with sulfur dioxid which is mixed with steam and forced through the matter to be treated. Another important feature of my invention is the provision of an apparatus to effectually carry out my improved process of treating waste organic substances in a manner to accomplish the objects above set forth.

Other objects and important features of the invention will appear from the following description and claims when taken in connection with the accompanying drawing, which drawing shows the apparatus for carrying out my process in a more or less diagrammatic manner.

Referring to the drawing, 2 indicates a tank which may be of any suitable construction, but preferably I use a tank which is cylindrical at its upper portion, the lower portion being conical, as shown. The waste organic matter to be treated is introduced into the tank 2 by means of an inlet 4 controlled by a valve 6, said inlet being situated near the top of the tank. Also situated near the top of the tank is an outlet 8 controlled by a valve 10. Any suitable and well-known means may be provided for causing the waste organic matter to be treated, to flow into the tank through the inlet.

When the tank has been sufficiently charged with waste organic matter to be treated, I introduce hot sulfurous acid into the tank under pressure, which intimately mixes with the tank contents. After sufficient treatment, the more solid portion of the tank contents settles to the bottom and may be drawn off through a valve 32 to a settling tank or tanks to permit a more complete separation of the solid materials from the grease.

The sulfurous acid used in the treatment of the tank contents is preferably formed by burning sulfur in contact with air, thus forming $SO_2$. At a convenient stage in the process I mix the $SO_2$ with steam under pressure, thereby forming sulfurous acid.

In the particular apparatus which I have devised for carrying out my improved process, I provide a gas conveyer 12 which passes into the tank 2 through a central opening in the top thereof and reaches downwardly to a distance below the center of the tank. A portion of this gas conveyer is made narrow at the point 14, and within the gas conveyer at the beginning of the narrowed portion I introduce a steam pipe 16 through which steam under pressure may be led at will. Below the point 14, the gas conveyer 12 is again enlarged and fits into a T-member 18, the steam pipe passing through the base of the T-member and, after being bent at a right angle within the T-member, passes through the upper opening therein and into the restricted portion 14 of the gas conveyer 12. The sulfur is burned in a chamber 20 having an air opening 22. From the chamber 20 the sulfur dioxid passes through an opening 24 in the end of the chamber 20 opposite to the opening 22 and through an opening 26 into a second gas chamber 28. The opening 24 is smaller than the opening 26, leaving an air space for the free entrance of air into the gas chamber 28 for the purpose of further oxidizing any sulfur which has not been completely combined in the chamber 20. The chamber 28 is also in the form of a T having an upper opening 30 into which fits the lower portion of the T member 18. When steam is admitted to the pipe 16, the $SO_2$ gas generated in the chambers 20 and 28 is aspirated into the gas conveyer 12 and is forced by the steam pressure into the tank 2, sulfurous acid being formed by the mixture of the steam with the $SO_2$ within the gas conveyer 12. It will be understood that during the time the contents of the tank 2 is being treated with the hot sulfurous acid, the valve 10 is open and the material being treated may flow into other similar tanks, if necessary. While in the particular form of the device disclosed, the pressure of the steam is used to cause the gases to become mixed with and permeate the substances to be treated, it is to be understood that other means can be used to create a flow of the gases through the organic material to be treated.

With the method of treatment of waste organic matter which I have devised and set forth in the above description, I am enabled to obtain a very effectual separation of the grease contained in the organic matter treated, with the resulting effect that the fertilizer cakes which may be made out of the solid matter which separates from the grease are substantially free of grease and therefore dry out very quickly. In processes heretofore in use, the amount of grease contained in the resulting fertilizer cake approximates nine per cent., while the cake resulting from my process contains only one per cent. grease. The yield of grease is consequently much larger than the yield in previously used processes, and such grease is substantially free from fatty acids.

Having thus described my invention, what I claim as new and desire to secure by Letters Patent is—

1. An apparatus for treating waste organic matter, comprising a tank in which the waste organic matter is introduced, a receptacle in which sulfur is burned in contact with air, a second receptacle open to the air and communicating with said first receptacle, a gas conveyer leading from said last-mentioned receptacle to the waste tank, and a steam jet interposed in said conveyer for aspirating the gas from said second mentioned gas receptacle.

2. An apparatus for treating waste organic matter, comprising a tank in which the waste matter is introduced, a receptacle in which sulfur is burned in contact with air, a second receptacle open to the air and communicating with said first receptacle, a gas conveyer connected to said last mentioned receptacle and leading into said waste tank and reaching down to a position near the bottom thereof, and a steam jet interposed in said conveyer for aspirating the gas from said last mentioned receptacle, thereby causing a mixture of steam and $SO_2$, and causing said mixture to pass through the tank contents.

Signed at New York city, N. Y., this 14th day of November 1918.

ANGUS MACLACHLAN.